July 25, 1939.　　　　K. W. ROHLIN　　　　2,166,968
APPARATUS FOR CONTROLLING THE OPERATION OF INTERNAL
COMBUSTION ENGINES OF THE MULTICYLINDER TYPE
Filed Dec. 18, 1936　　　9 Sheets-Sheet 2
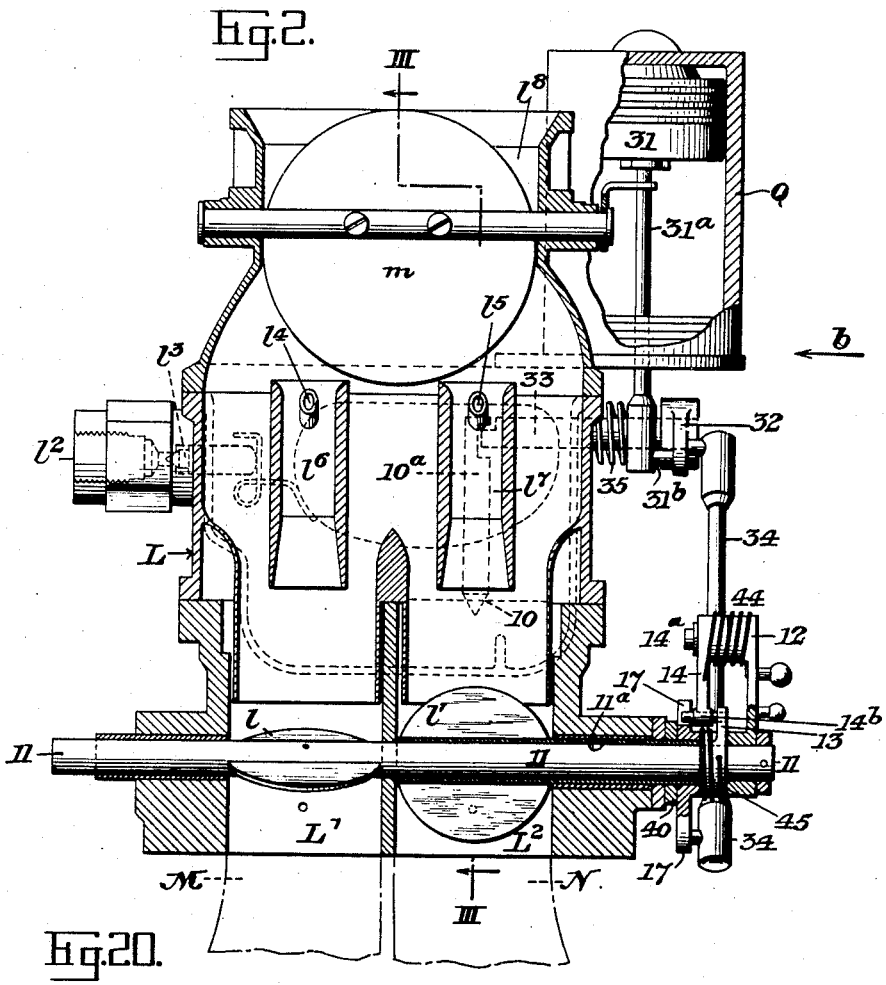
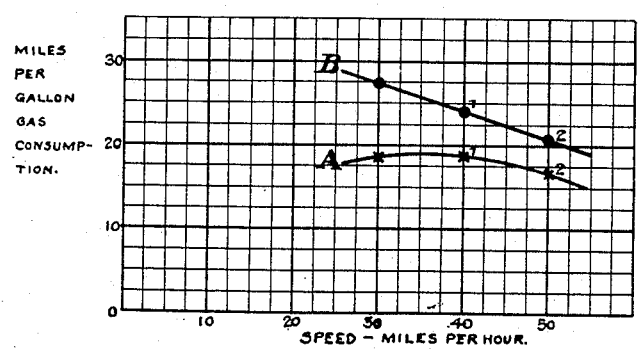
INVENTOR.
Karl W. Rohlin,
BY
ATTORNEY.

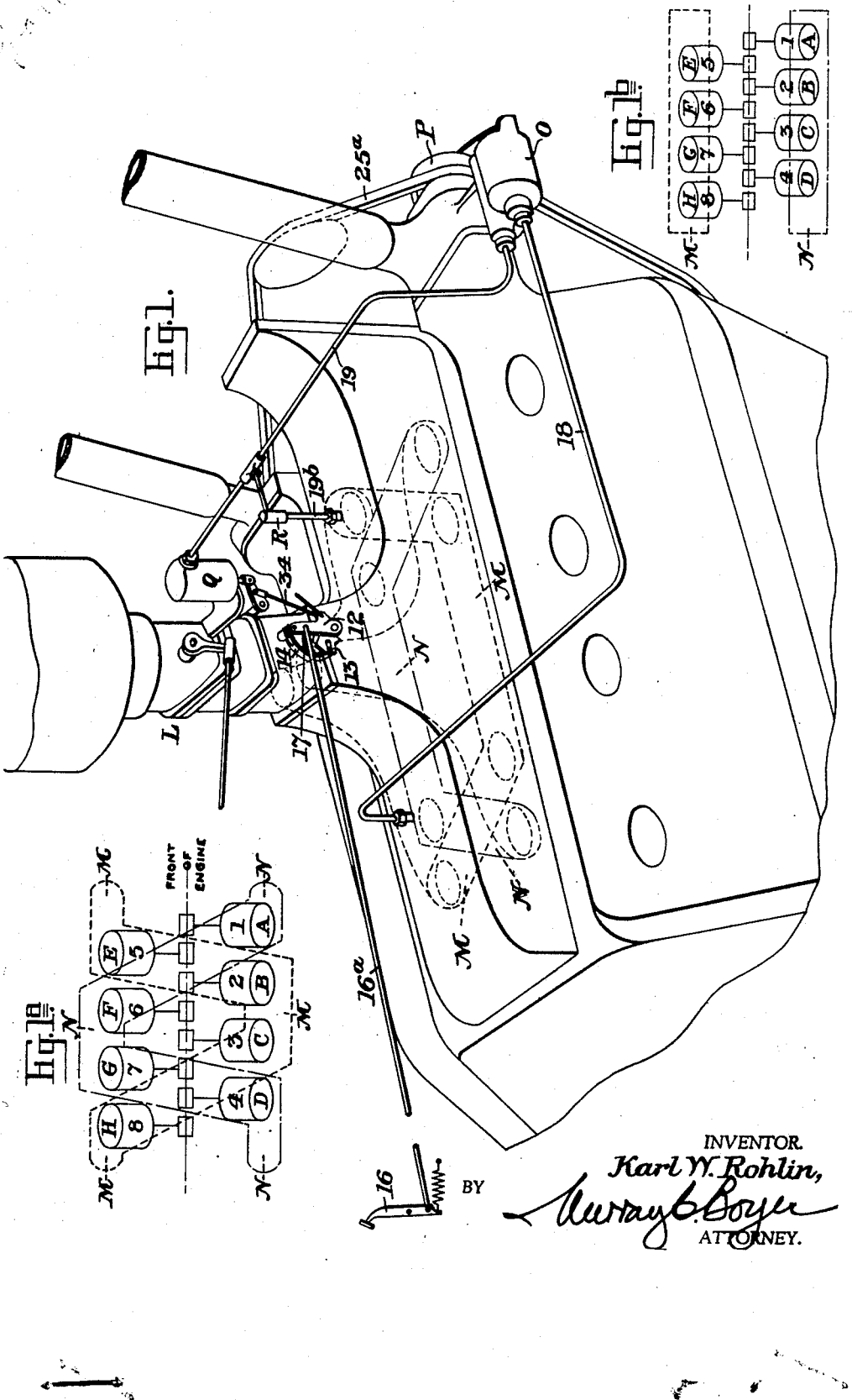

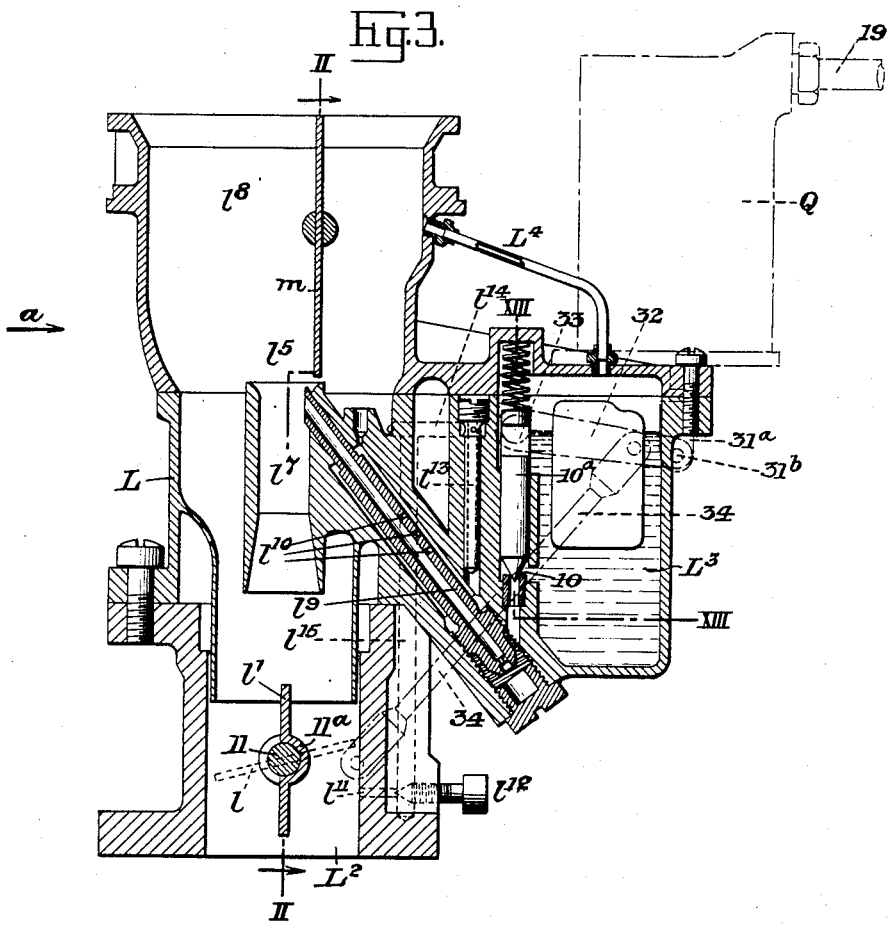
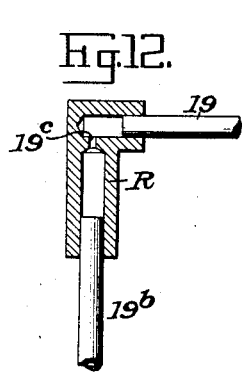
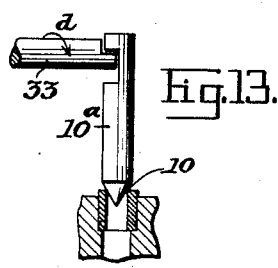

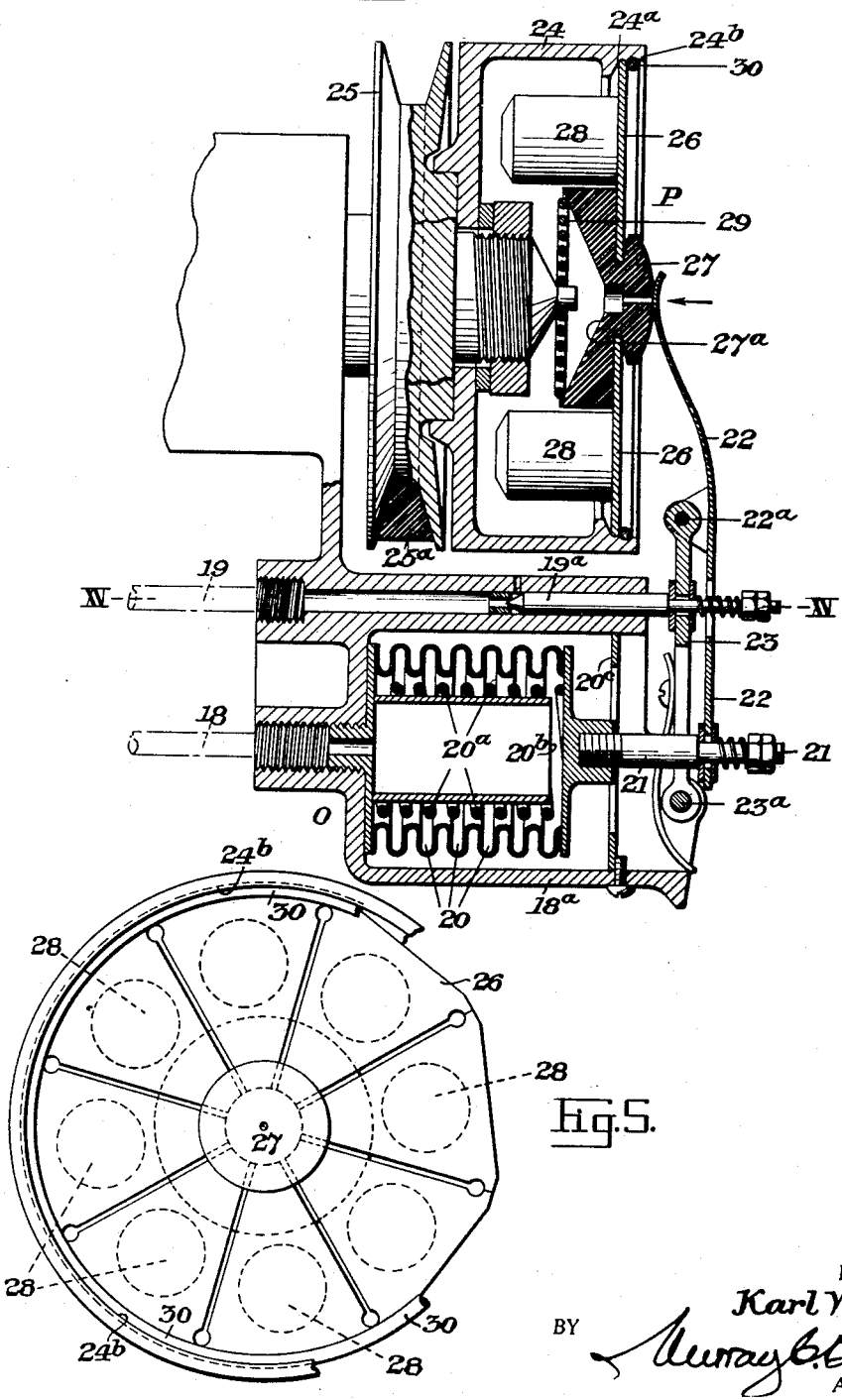

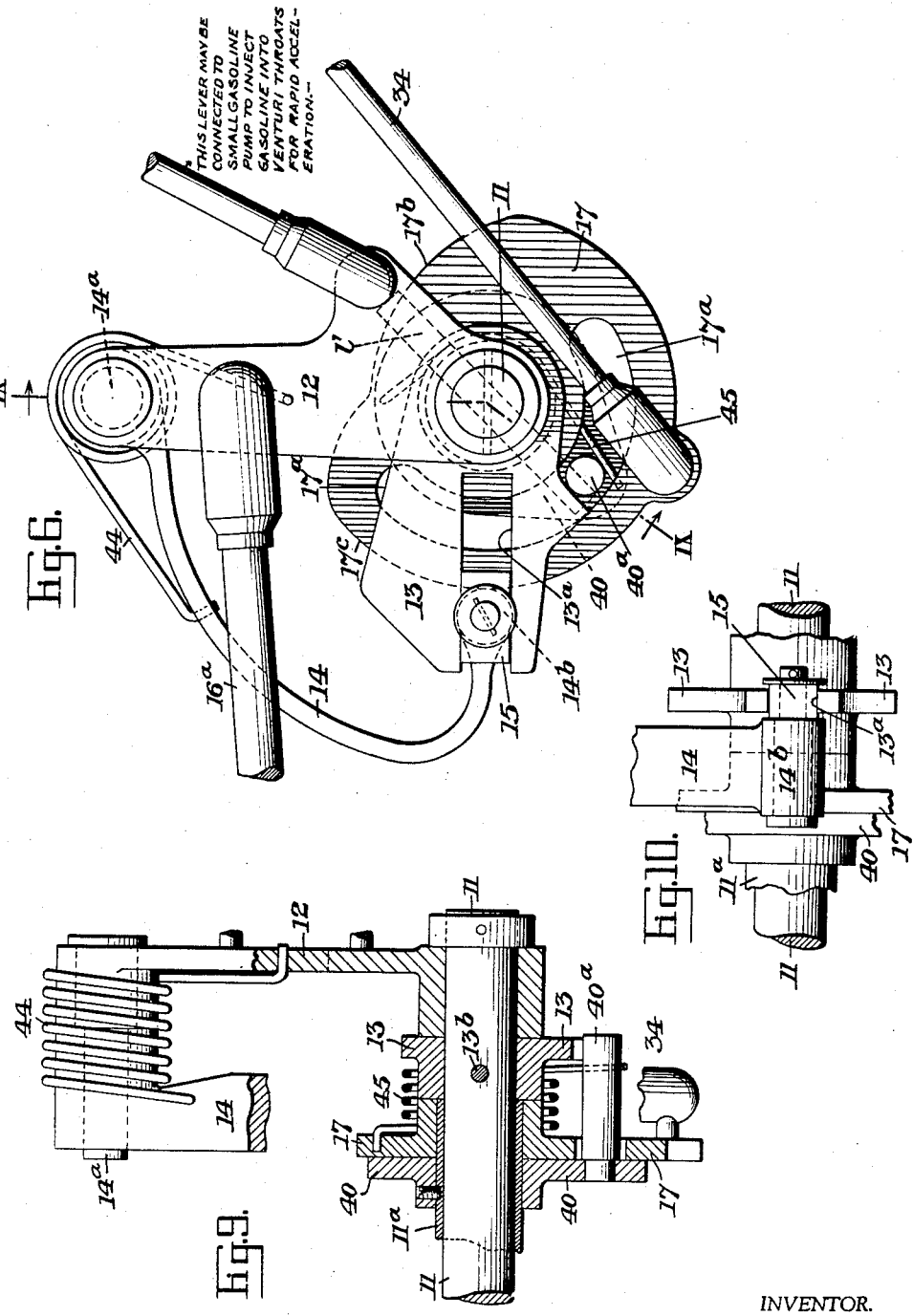

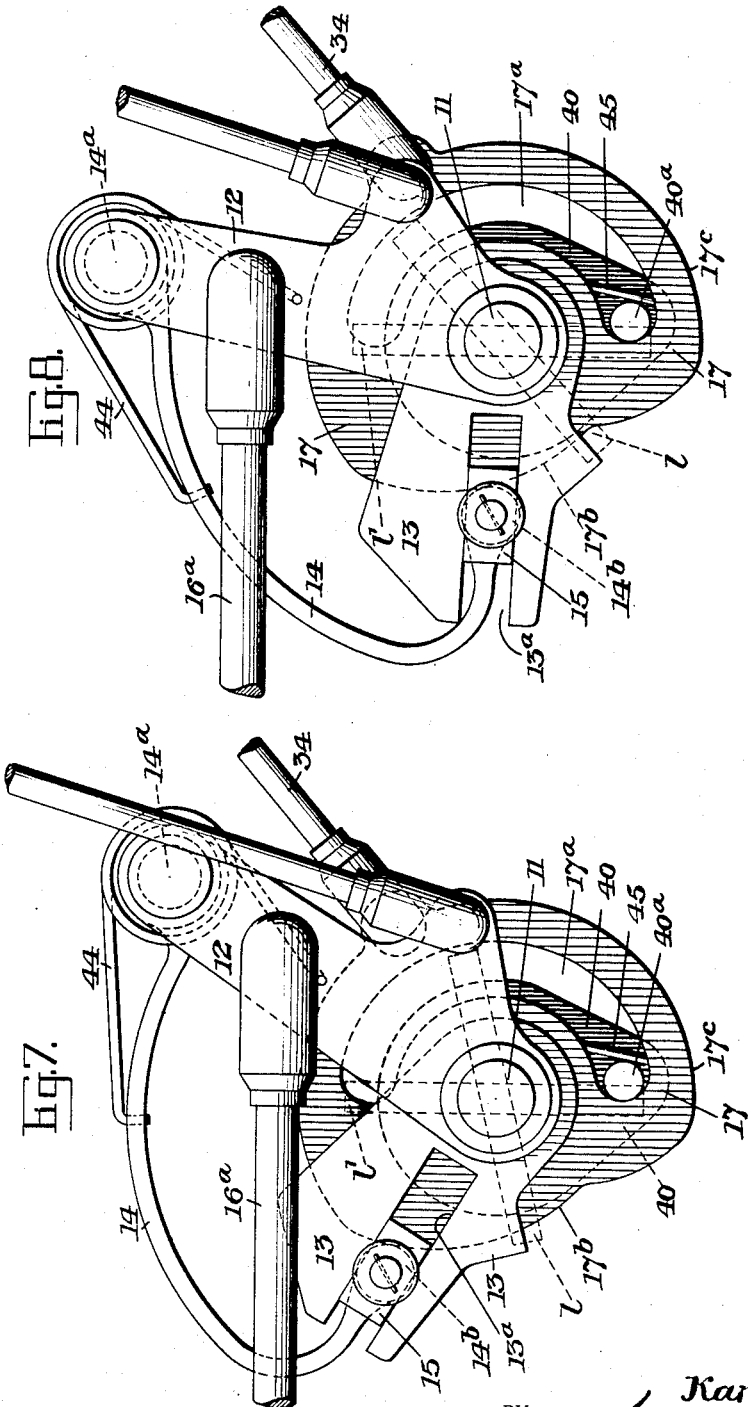

July 25, 1939. K. W. ROHLIN 2,166,968
APPARATUS FOR CONTROLLING THE OPERATION OF INTERNAL
COMBUSTION ENGINES OF THE MULTICYLINDER TYPE
Filed Dec. 18, 1936 9 Sheets-Sheet 7
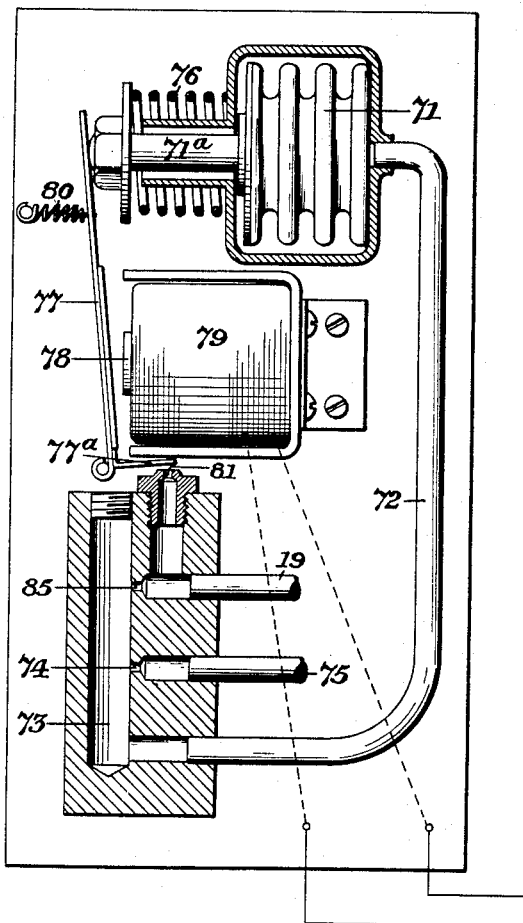
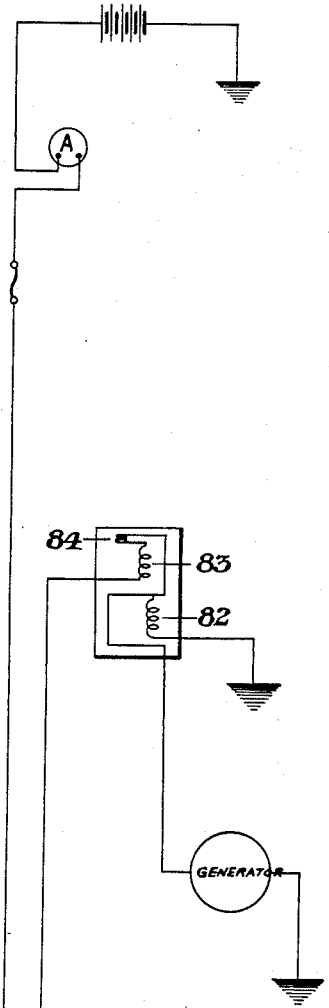
INVENTOR.
Karl W. Rohlin,
BY
ATTORNEY.

123. INTERNAL COMBUSTION ENGINES.
52
July 25, 1939.　　　K. W. ROHLIN　　　2,166,968
APPARATUS FOR CONTROLLING THE OPERATION OF INTERNAL
COMBUSTION ENGINES OF THE MULTICYLINDER TYPE
Filed Dec. 18, 1936　　　9 Sheets-Sheet 8
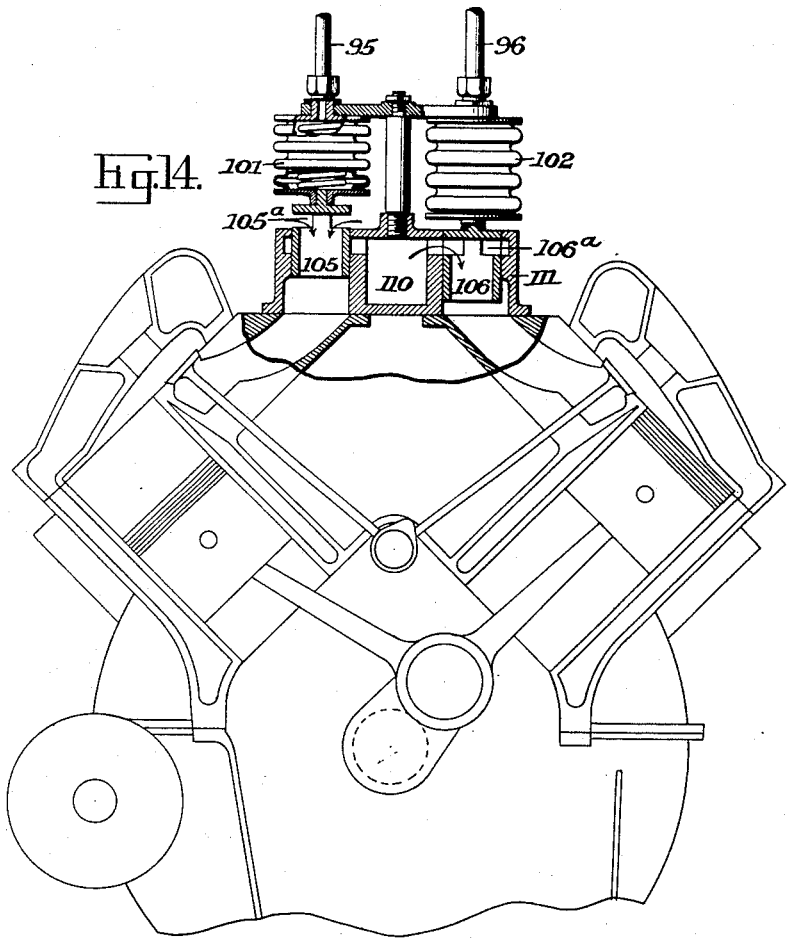
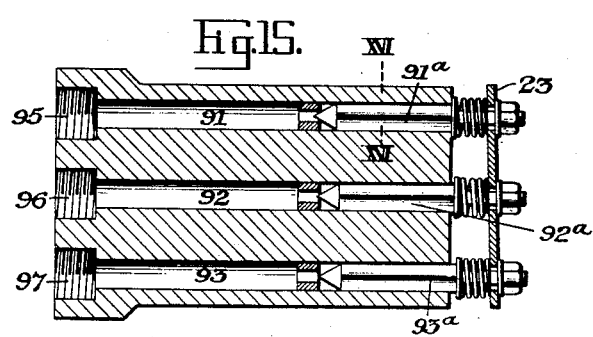
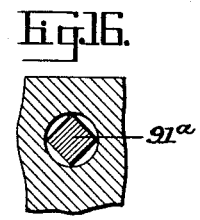
INVENTOR.
Karl W. Rohlin,
BY Murray C. Boyer
ATTORNEY.

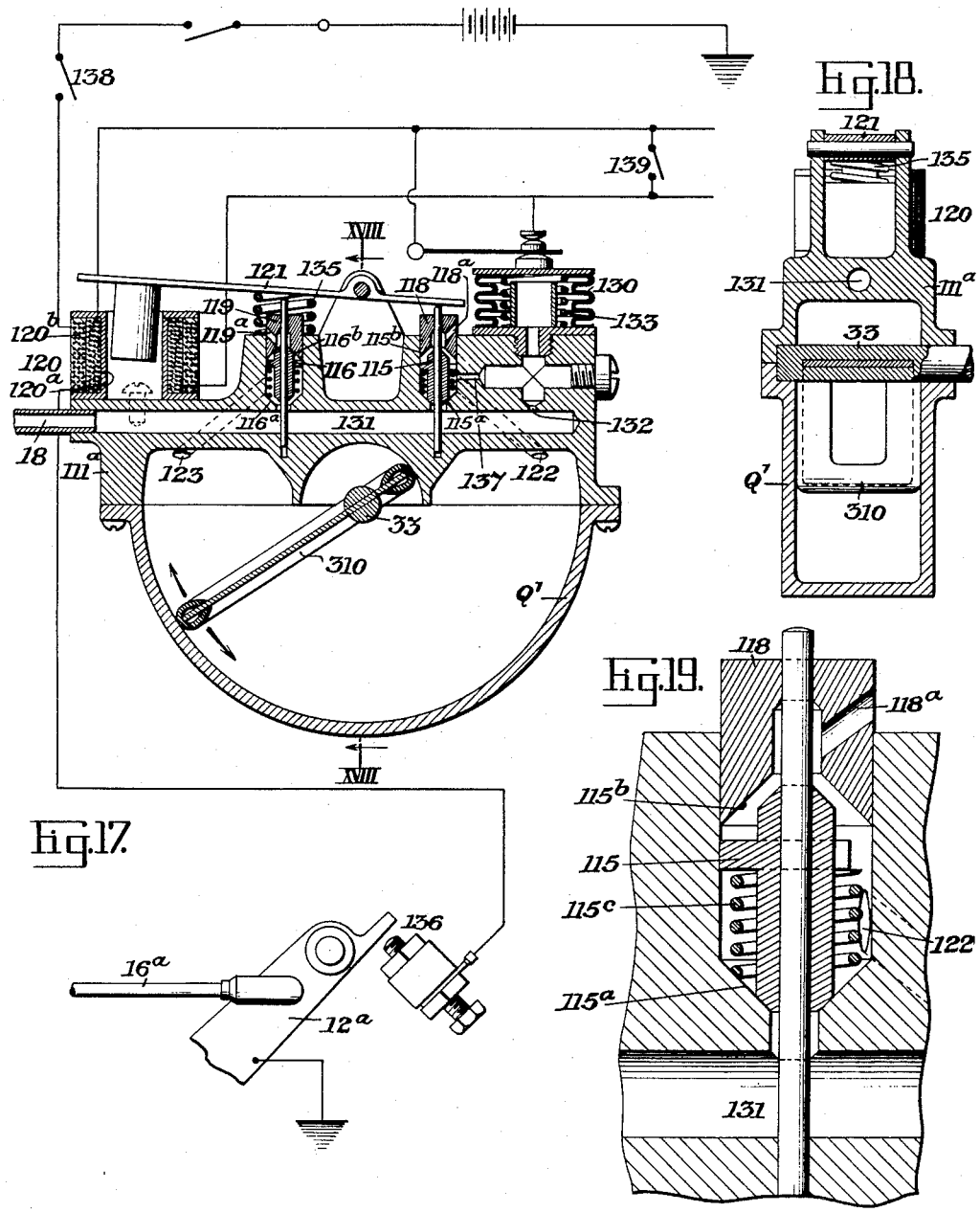

UNITED STATES PATENT OFFICE 2,166,968

APPARATUS FOR CONTROLLING THE OPERATION OF INTERNAL COMBUSTION ENGINES OF THE MULTICYLINDER TYPE

Karl W. Rohlin, Moorestown, N. J.

Application December 18, 1936, Serial No. 116,464

45 Claims. (Cl. 123—52)

My invention relates to the control of internal combustion engines of the multi-cylinder type and one object thereof is to effect a more efficient operation of engines of this type during certain periods of power-producing employment.

A further object of my invention is to provide simple and readily operable means for automatically and economically effecting my improved method of control.

Practically all engines of the internal combustion multi-cylinder type employed for propulsion of vehicles and boats today are under throttle valve control; such valves being usually of the butterfly type which effect a variation in the amount of the explosive charge (fuel-air mixture) delivered by the carburetor to the cylinders. Increased power, or increased speed, is usually produced by further opening of the throttle valve so as to increase the amount of the explosive charge delivered to the cylinders. Great flexibility in the rate of power production or speed is obtained but the efficiency of fuel use is low in the operation of automobile engines a large part of the time, and in boat engines during all periods of partial loads, i. e., throttling of the valve.

The primary purpose of this invention is to effect more efficient use of the fuel employed by operating an engine of the internal combustion multi-cylinder type, or a portion of such engine, at more nearly its optimum load. For instance, instead of inefficiently using all cylinders of an eight-cylinder automobile engine to produce power after it has attained the desired speed on the level, or while it is coasting down hill, I propose to cut out explosions and the production of power in four, or perhaps six, of the cylinders of such engine temporarily and to slightly increase the amount of fuel consumed in the remaining four, or two, cylinders, so as to increase the low load that they would otherwise sustain. During such periods of four- or two-cylinder firing, not only is the efficiency of the firing cylinders increased but the heat that would otherwise be dissipated through the cooling system by the four or six cylinders not firing is saved and fuel thereby conserved.

Ordinarily, internal combustion engines of the multi-cylinder type operate with vacuum in the intake manifold up to twenty-five inches of mercury when the motor is idling or when the car is coasting or producing ten or twenty percent of its maximum power output. By the use of my invention I am able to reduce, close to zero, this vacuum and its resultant drag during the suction stroke on the cylinders not in use, and the cylinders that are firing are required to do less work to overcome internal resistances in the engine than would be the case if the suction strokes of all the cylinders were effected at the usual fairly high degree of vacuum. When coasting at moderate or high speeds a partial "free-wheeling" effect is noticeable; that is to say, breaking or reducing the vacuum on some of the cylinders during their suction strokes reduces the "braking" effect of the engine and a part of the savings attributed to "free-wheeling" is obtained, in addition to the other savings mentioned.

This invention provides for automatically cutting cylinders into or out of firing service as the need for power changes, provided the speed of the motor is sufficient to insure smooth operation. When employed in connection with the operation of an automobile engine all cylinders are automatically fired and brought into operation when maximum power is needed for hill climbing, rapid acceleration, or top speeds. When the power requirements are low or moderate, a group of the cylinders, whose number may be predetermined, may stop firing. Furthermore, provision is made for automatically firing all cylinders, even while the power requirements are low if, at the same time, the engine speed is low—below perhaps twenty M. P. H., with the car in high gear—since, otherwise, objectionable vibrations similar to those associated with engines employing a small number of cylinders, four for instance, operating at low speeds, might occur.

It will be understood, of course, that the cylinders are cut out of firing service in such order that the smoothest possible motor operation results. For instance, considering an eight cylinder, four-cycle, engine, having a firing order of 1, 5, 4, 8, 6, 3, 7, 2 (hereinafter indicated as A, E, D, H, F, C, G, B,) cylinders 1, 4, 6 and 7 (A, D, F and G) might not fire during some periods of engine operation, while the remaining four cylinders would fire at 90° intervals.

Further objects of the invention are:

1. To lessen the amount of heat necessary to be dissipated through the radiator by reducing the number of cylinders in which explosions take place.

2. To reduce fuel consumption by operating less than all of the cylinders of the engine when the latter is idling.

3. To reduce oil consumption by practically eliminating vacuum in some of the cylinders and by reducing the vacuum in the remaining cylinders, and 4. To reduce corrosion in the cylinders by limiting the corrosive effect of the explosive gases to as few cylinders as possible.

In brief, and broadly speaking, the improved method forming the subject of my invention comprises cutting off fuel delivery and increasing air delivery to some cylinders during periods of moderate to high speed and low to moderate power requirements.

A refinement of my improved method contemplates automatically increasing the fuel and air delivery to the firing cylinders, at the time some of the cylinders stop firing, so as to make the power output of the engine constant at the time of change in operation. Stated another way, the method comprises the automatic stoppage of fuel delivery to some cylinders in response to variations in motor speed and the vacuum ahead of the intake valves.

A further object in the carrying out of my improved method of engine control is to provide for increased air delivery to the non-firing cylinders.

One form of my improved control mechanism involves the use of a centrifugal governor operatively connected with or attached to a rotating part of the engine such as the pulley of one of the circulating pumps; such governor being correlated with a pressure-sensitive bellows-diaphragm element responsive to changes in vacuum in the engine manifold; all of which parts cooperate to control an improved form of "multiple jet" carburetor.

In lieu of utilizing a centrifugal governor, I may employ a centrifugal pump arranged to impel a suitable fluid in such manner as to produce varying static heads of pressure on its delivery side as its speed, and therefore the engine speed, varies; such static heads being utilized in a manner hereinafter described as to actuate a pressure-sensitive element designed to operate a series of pneumatic valves controlling engine operation.

I may also utilize the speedometer of an automobile, for instance, which responds to changes in the speed of the engine, to make and break electrical contacts to effect the operation of solenoids, hereinafter described, and in that manner actuate mechanism for cutting cylinders into or out of power-producing service; depending upon the speed of the engine and the power required.

It is obvious that electrical means, which may be in circuit with the electrical system of an automobile, for instance, and utilizing variations in voltage or amperage, might be similarly employed, and another form of mechanism within the scope of my invention and more particularly described hereinafter contemplates the use of the ordinary direct current generator of the automobile and its associated cutout, together with additional electrical mechanism, which may be employed in lieu of the centrifugal governor mentioned above.

Still another form of mechanism within the scope of my invention includes the use of valves in the intake manifold associated with groups of two, three, four or more cylinders; an arrangement that permits the use of standard single or dual jet carburetors and is probably of greatest value in association with engines having twelve or more cylinders.

And still another modification of my improved method of multi-cylinder engine control includes an arrangement in which the single-seating valve for pneumatic control is replaced by multiple-seating valve structures designed to actuate a double-acting piston operatively connected with the dual jet carburetor or multiple carbureting jets.

The various forms of my invention may include an additional feature designed to insure that power will be produced in only a limited number of the cylinders during idling, and another feature that provides for firing all of the cylinders when a cold motor is being put into service.

These and other features of my invention are more fully set forth hereinafter; reference being had to the accompanying drawings, more or less diagrammatic in character, in which:

Figure 1 is a perspective view illustrating a portion of a V-8 engine structure; showing the general scheme or arrangement of features comprising one form of my invention; such view being largely diagrammatic.

Figs. 1ª and 1ᵇ are diagrammatic plan views of an eight-cylinder engine of the internal combustion type, showing by dotted lines the relation of the manifold channels.

Fig. 2 is a sectional elevation of one form of a dual-jet carburetor of the type diagrammatically illustrated in Fig. 1, taken on the line II—II, Fig. 3, and looking in the direction of the arrow $a$.

Fig. 3 is a sectional elevation of the carburetor shown in Fig. 2, taken on the line III—III, Fig. 2, looking in the direction of the arrow $b$.

Fig. 4 is a sectional elevation of one form of control of governing mechanism within the scope of my invention.

Fig. 5 is a view in elevation, partly broken away, of one of the operating elements shown in Fig. 4.

Fig. 6 is a fragmentary view in elevation looking in the direction of the arrow $b$, Fig. 2, of mechanism, including lever connections, employed to operate the valves of the carburetor; such mechanism being shown in position to feed fuel to all eight cylinders of an automobile engine, when the accelerator pedal is depressed to an extent approximating one-half of its total movement.

Fig. 7 is a view similar to Fig. 6; showing the mechanism in the position it will assume when the carburetor is feeding fuel to four cylinders, with the accelerator pedal in substantially fully raised position.

Fig. 8 is a view similar to Fig. 7, showing the mechanism in the position it will assume when the accelerator pedal is depressed to an extent approximating one quarter of its total movement.

Fig. 9 is a view of the mechanism shown in Figs. 6, 7 and 8, partly in section on the line IX—IX, Fig. 6.

Fig. 10 is a fragmentary view showing in elevation part of the structure shown in Figs. 6, 7 and 8 which is broken away from the part shown in Fig. 9.

Fig. 11 is a diagrammatic view showing a modified form of controlling structure, partially electrically operated, within the scope of my invention.

Fig. 12 is a sectional view of one of the fittings of the structure shown in Fig. 1.

Fig. 13 is a sectional view on the line XIII—XIII of one of the valves of the carburetor structure shown in Fig. 3.

Fig. 14 is a sectional view of another form of fuel and air regulating mechanism within the scope of my invention.

Fig. 15 is a sectional view in the plane of the line XV—XV, Fig. 4.

Fig. 16 is a sectional view on the line XVI—XVI, Fig. 15.

Fig. 17 is a view illustrating a further form of electrical and vacuum controlling means, within the scope of my invention.

Fig. 18 is a sectional view on the line XVIII—XVIII, Fig. 17.

Fig. 19 is an enlarged sectional view of one of the valve elements illustrated in Fig. 17, and Fig. 20 is a diagram of comparative operating tests.

In the accompanying drawings, some of which are diagrammatic, Figure 1 represents a perspective view of a portion of an internal combustion engine of the V-8 type, and Figs. 1a and 1b are diagrammatic plan views of the cylinders of the same and manifold channels communicating therewith. As illustrated, the cylinder block presents two banks of four cylinders each; both banks being inclined with respect to each other and operatively connected to the crank-shaft of the engine. For convenience of description, one bank of cylinders is indicated at A, B, C and D (1, 2, 3 and 4), while the other bank of cylinders is indicated at E, F, G and H (5, 6, 7 and 8).

In carrying out my invention in connection with an eight cylinder "V-type" motor, the cylinders are divided into groups of four cylinders each, and in the present instance, one group comprises the cylinders A, F, G and D, while the other group comprises the cylinders E, B, C and H. The explosive charges for these cylinders are delivered via a suitable manifold having a separate channel for each group; the manifold channel for the group of cylinders E, B, et seq., being indicated at M, while the manifold channel for the group of cylinders A, F, et seq., is indicated at N. These manifold channels are preferably arranged in the manner indicated at Fig. 1a and this arrangement has the advantage that each bank of cylinders of the twin V motor is kept up to a suitable operating temperature by the presence of at least two firing cylinders in each bank.

It should also be understood that preheating of the air delivered to the cylinders of the motor may be accomplished by any of the several methods, or by combinations of those methods, including preheating the air by means of the exhaust gases, or by the jacket water, before it enters the carburetor, and/or by means of special passages in the intake manifold arranged to carry hot exhaust gases to parts of the same to vaporize liquid or atomized charges of gasoline.

In order that explosive charges may be independently fed to the channels M and N for passage to the respective groups of cylinders, a multiple jet carburetor may be employed; indicated at L, and having a pair of discharge passages or feed outlets in communication with the respective manifold channels. So far, this is the usual arrangement of a typical V-8 engine mounting, and in the present instance and for the purpose of this description a Ford engine is indicated; all parts of the same as illustrated in the drawings, with the exception of the details of the manifold channels M and N and of the several attachments which form the subject of my invention, representing a Ford automobile engine of the 1936 model.

While this is the situation insofar as the present embodiment of my invention is concerned, it will be understood that, with but slight modification and without changing in any way the modus operandi, my invention may be applied to any type of internal combustion engine having two or more cylinders, with a single or multiple jet carburetor, or with separate carburetors feeding independent groups of cylinders in one or a plurality of banks. It is to be understood therefore that the showing of the features of my invention as associated with an engine of a certain type is to be considered as illustrative only, and not as a limitation of my invention in any sense whatever.

In the operation of automobile engines and similar motors of the multiple-cylinder internal combustion type, there are periods when the speed and load at which the engine is operating will not require power production in all cylinders. For instance, there may be times when one group of cylinders may be cut out of power production, while the other group is producing power. At such time it may be desirable to increase the amount of fuel fed to the power-producing cylinders. In the arrangement of two groups of cylinders—E, B, C and H, receiving fuel from manifold channel M, and A, F, G and D, receiving fuel from manifold channel N—it will be understood that either group may be cut out, but as it is essential that one group be in power-production at all times, it is only necessary to provide means for cutting out one group of cylinders, and in the present instance my improved controlling mechanism is employed to cut cylinders A, F, G and D, out of power-production when the operating conditions of the automobile warrant it, or when the speed and load of the engine warrant it.

One form of apparatus which may be utilized in carrying out one method within the scope of my present invention employs a governor including a vacuum chamber with a suitable diaphragm—preferably a diaphragm of the bellows-folded type—with associated mechanism operatively connecting a rotating part of the engine with the dual jet carburetor in order that the latter may be automatically controlled to deliver, under certain conditions of speed and/or load, charges of fuel to one or both groups of cylinders.

Considering the structure illustrated in Figs. 1 and 1a which are diagrammatic showings of an eight-cylinder engine block, I have indicated by dotted lines the manifold channels M and N which provide the necessary communication between a multiple jet carburetor such as indicated at L and arranged in operative position with respect to the same and the respective groups of cylinders, E, B, C and H, and A, F, G and D; more particularly indicated in the diagrammatic view, Fig. 1a. The carburetor and its various passages is more clearly shown in the sectional views, Figs. 2 and 3. The manifold channels M and N receive fuel and air, or in one instance, air only, from the carburetor L via separate outlets indicated at L' and L$^2$; outlet L' communicating with the channel M while outlet L$^2$ communicates with the channel N, and control of such delivery to one of these channels, in the present instance, the channel N, is a particular object of my present invention.

The delivery of fuel is controlled by the position of butterfly valves $l$ and $l'$, located in the passages L' and L$^2$; such valves being independently operable by mechanism hereinafter described. Formed within the shell of the carburetor L is a gasoline chamber L$^3$, which receives its supply from pumping means (not shown) entering at $l^2$ past a float-controlled valve $l^3$. In the normal operation of the carburetor, the charges of fuel are sucked through jets $l^4$ and $l^5$ from the gasoline chamber L$^3$ under the influence of air drawn through or passing the Venturi throats $l^6$ and $l^7$, while the necessary air for admixture with the fuel charges enters via the opening $l^8$ of the carburetor past the choke valve $m$, which is normally in the fully open position, as illustrated in Figs. 2 and 3.

In operating the carburetor in connection with the improved method of engine operation and/or control forming the subject of my invention, I desire to control and at times completely shut off passage to one of the fuel supply jets—that indicated at $l^5$, for instance, which supplies the manifold channel N—and for this purpose the passage from the gasoline chamber $L^3$ to this jet is provided with a valve seat or port 10, controlled by a valve 10ᵃ, which is operated in the manner hereinafter set forth. The jet passages include metering tubes $l^9$, and that for jet $l^5$, particularly, may be provided with leak ports $l^{10}$ communicating with an idling jet, for a purpose hereinafter described.

The rate of fuel flow through jets $l^4$ and $l^5$ depends on the difference between the pressure existing in the float chamber $L^3$ on one hand, and the pressure existing in the Venturi throats $l^6$ and $l^7$ on the other hand; the pressures in said throats depending on the amounts of air flowing through them, while the pressure in chamber $L^3$ is usually equalized with the atmosphere through suitable ports (not shown). I may use this arrangement provided the throats $l^6$ and $l^7$, jets $l^4$ and $l^5$, and valve port 10, etc., are suitably proportioned in relation to the air entrance opening $l^8$, the Venturi throats $l^6$ and $l^7$, and other resistances to air flow through and preceding the carburetor air passages. But in some instances better proportioning of fuel flow will result if the float chamber $L^3$ is equalized with the pressure in the air entrance opening $l^8$, instead of directly with the atmosphere, so as to insure fuel flow through jet $l^4$ in proportion to the pressure drop from the air entrance $l^8$ to throat $l^6$ only, unaffected by the pressure drops into air entrance $l^8$, which are increased appreciably by the complete opening of butterfly valve $l'$, in the manner hereinafter described. The communication between the chamber $L^3$ and air entrance opening may be by a channel such as indicated at $L^4$.

An important feature of my invention is the provision of means for controlling the position of the butterfly valves $l$ and $l'$, and one form of such means which may be employed in connection with the carrying out of my improved method of engine control is more particularly illustrated in Figs. 2 and 3, and will now be described. The butterfly valve $l$ is mounted on a rock shaft 11, journaled in the lower part of the carburetor, while the butterfly valve $l'$ is carried by a sleeve shaft 11ᵃ mounted upon and independently oscillatable with respect to the rock shaft 11. The shaft 11 is operatively connected to a crank arm 12 journaled thereon through a lever 13, slotted at 13ᵃ and pinned at 13ᵇ to the rock shaft 11, and a floating link 14, fulcrumed on an arbor indicated at 14ᵃ and carried by the crank arm 12; the opposite end 14ᵇ of said floating link 14 carrying a slide-block 15, movable in the slot 13ᵃ of the lever 13. The crank arm 12 is under control of the accelerator pedal 16, through a connecting rod 16ᵃ. Mounted on the sleeve shaft 11ᵃ and disposed adjacent the slotted lever 13, is a cam element 17 which is actuated by pressure-operated means under the influence of the controlling means in a manner hereinafter described.

My improved method of control depends upon the degree of vacuum in the manifold channels M and N; a condition that is varied by the speed of the motor and the position of the butterfly valves $l$ and $l'$ which control the passages leading to said manifold channels. Such positioning is effected by accelerator pedal depression and may be further effected automatically through mechanism operatively connected to said valves and mounted adjacent to the carburetor. The pressures or vacua thus produced are transmitted via tubes or pipes 18 and 19, which afford communication between one of the manifold channels, that indicated at M, for instance, and automatically operated control and governing mechanism indicated at O and P and a piston-containing cylinder Q.

From the intake manifold channel M, which delivers fuel-air mixture to the four cylinders that are always producing power when the motor is in operation—E, B, C, H, for instance—the tube or pipe 18 leads to governing mechanism indicated generally at O; a sectional view of which is shown in Fig. 4. In the present instance this comprises a shell 18ᵃ containing a bellows diaphragm 20, and a spring 20ᵃ serving to normally hold said diaphragm in its fully expanded condition. The four cylinders—A, F, G, D,—receive fuel and air, or air only, from the manifold channel N. The tube or pipe 18 affords communication between the manifold channel M ahead of the intake valves in the four firing cylinders—E, B, C, H, for instance—and the bellows diaphragm 20 of such governing mechanism in which a variable vacuum exists; a spring 20ᵃ serving to resist contraction of said bellows diaphragm 20 under varying degrees of vacuum. Stops 20ᵇ and 20ᶜ are provided to limit the motion of said bellows diaphragm in both directions. A rod 21 connected to and operated by the bellows diaphragm 20 serves to transmit its movement to a floating lever 22, fulcrumed at 22ᵃ on a valve-operating lever 23, which is pivotally mounted at 23ᵃ on the shell 18ᵃ.

The rotating speed-responsive device forming part of the governing element and indicated generally at P, may comprise a casing 24, mounted on a pulley 25, to which motion is imparted by the fan belt indicated at 25ᵃ, which is driven from the crank shaft of the engine in the usual manner. The casing 24 carries a plurality of segmental plate sections 26, eight in the present instance, which are confined at their outer ends while their inner ends may move, and these sections carry at their inner ends a block 27, having its rear portion concavely recessed at 27ᵃ. The plate sections 26 also carry weights 28 that tend to move radially outward and cause the inner ends of said plate sections to move inwardly as the speed of the pulley 25 increases; a flat coiled spring 29 being provided to partially resist or restrain such movement. The outer ends of the plate sections 26 may be held in a seat 24ᵃ of the casing 24 by a suitable retaining ring 30 fitting beneath a rim 24ᵇ. The block 27 is preferably of rubber so that, regardless of any position the plate sections 26 may assume when they are in motion, all vibration and noise will be avoided. The free end of the floating lever 22 bears on the centrally disposed block 27 of the centrifugal speed responsive mechanism P, and the combined effect of the movements of the plate sections 26 and the bellows diaphragm 20, imparts motion to said lever 22 which in turn effects movement of the lever 23 to open or shut a valve 19$^a$, controlling passage of air under atmospheric pressure to the tube 19, and thence to cylinder Q and the manifold channel M, for the purpose hereinafter described.

At a point in the tube 19 affording communication between the governor mechanism O and the cylinder Q, I provide a fitting R, shown more fully in the sectional view, Fig. 12; the passages of which fitting are in communication with the manifold channel M and are under the vacuum normally existing therein. Air passing valve 19$^a$ flows through tube 19 to said fitting R, to tube 19$^b$, and thence to manifold channel M feeding the power-producing cylinders which are always in operation. An orifice 19$^c$ within the fitting R sharply limits the amount of air drawn past the valve 19$^a$ into manifold channel M, so that the pressure in said tube 19 approaches that of the atmosphere, whenever valve 19$^a$ is open. The vacuum existing in tube 19 is practically equal to the vacuum existing in manifold channel M when valve 19$^a$ is closed, and little or no air flows through said tube 19. Whenever valve 19$^a$ is open, however, pressure substantially that of the atmosphere is transmitted to cylinder Q.

Within the cylinder Q is a piston 31, carried by a piston rod 31$^a$, and the lower end of this rod is connected at 31$^b$ to a crank arm 32, carried by a rock shaft 33, suitably journaled in the carburetor casing; such crank arm being connected by a link 34 to the cam 17. The rock shaft 33 controls the position of the valve 10$^a$ which regulates feed of fuel to the jet $l^5$, and when the vacuum in cylinder Q is broken, upon opening the valve 19$^a$, the rock shaft 33 and the crank arm 32 are moved to lower the piston 31 by means of a torsion spring 35 carried by the rock shaft 33; such action of the rock shaft raising valve 10$^a$ from its seat 10. Piston 31 will be raised against the action of said spring 35 when the valve 19$^a$ is shut and a vacuum again exists between manifold channel M and cylinder Q; which position is shown in Fig. 2. This is the carburetor position for light load running at moderate or high speeds, with four pistons of the engine running free and four developing or producing power.

Fuel is delivered to the jet $l^5$ of the carburetor from the inlet passage controlled by the valve 10$^a$. Upward movement of piston 31 to the position shown in Fig. 2, raises the piston rod 31$^a$ and the crank arm 32 and turns rock shaft 33 in a direction opposite to that indicated by the arrow $d$ in Fig. 13; which permits valve 10$^a$ to engage seat 10 of the fuel line and shut off feed of fuel to either the main jet $l^5$, or an idling jet communicating with the outlet passage $L^2$; completely stopping combustion and the production of power in the group of cylinders A, F, G and D. If an idling jet is employed, such as indicated at $l^{11}$ and controlled by a valve $l^{12}$, such idling jet normally receives fuel from the metering tube $l^9$ via the leak ports $l^{10}$ and passages $l^{13}$, $l^{14}$, and $l^{15}$, and when the valve 10$^a$ is closed, feed to such idling jet is stopped. Outlet passage L' continues to receive fuel, and cylinders of group E, B, C and H are unaffected except as described later in connection with the mechanism for maintaining uniform power delivery when cutting cylinders into or out of power production.

Upward motion of crank arm 32 also raises the link 34 connected to and moving the cam 17 into the position shown in Figs. 7 and 8, which carries, counter-clockwise, a lever 40, through engagement of the end wall of an arcuate slot 17$^a$ of the cam 17 with a pin 40$^a$ of said lever 40; thereby effecting further actuation of sleeve shaft 11$^a$ to move the butterfly valve $l'$ carried thereby into the wide open position, (see Figs. 2 and 3) so that the flow of air to the non-firing group of cylinders A, F, G and D is unobstructed with a minimum resistance to motion (or drag of the pistons in said group of cylinders) and the partial free-wheeling effect previously noted is produced.

Besides opening the butterfly valve $l'$, movement of the cam 17 also actuates mechanism providing for the maintenance of uniform power production when four cylinders are cut into or out of firing service; such result being accomplished by increasing the opening of butterfly valve $l$ controlling the delivery of fuel and air to the group of cylinders E, B, C and H, which continue firing, to effect increased power production in those cylinders when the four cylinders A, F, G and D stop firing, and reducing the opening of butterfly valve $l$ when said latter cylinders again fire.

The end 14$^b$ of the floating link 14 engages the edge of the cam 17, and movement of the latter has brought its depressed surface 17$^b$ into position to relocate the slide 15 carried by the end of said floating link, which slide moves in the slot 13$^a$ of the lever 13. The end 14$^b$ of the floating link 14 is caused to move to the right under the action of a spring 44; being maintained thereby in engagement with the surface of the cam 17 regardless of the position of the latter, or of the crank arm 12, which is moved by the accelerator pedal 16 through the connecting rod 16$^a$.

Movement of the cam 17 to position its surface 17$^b$ in operative engagement with the end 14$^b$ of floating link 14 permits the latter to move to right under the action of the spring 44 (it being assumed that connecting rod 16$^a$, accelerator pedal 16, and the driver's foot remain stationary for the time being), and lever 13 is slightly rotated counter-clockwise with respect to lever 12, from the position shown in Fig. 6, to approximately that shown in Fig. 8. As lever 13 is pinned to shaft 11 to which the butterfly valve $l$ is rigidly connected, said valve is therefore also slightly moved counter-clockwise to open slightly and deliver more fuel and air to cylinders of group E, B, C and H, to compensate for the cutting off of power production in cylinders of group A, F, G and D.

Suppose now that the driver of the car wishes to accelerate slightly. He depresses the accelerator pedal 16, thereby moving the connecting rod 16$^a$ and rotating the crank 12, floating link 14, lever 13, shaft 11, and butterfly valve $l$ slightly counter-clockwise; and permitting delivery of slightly more fuel and air to cylinders of group E, B, C and H. During such operation the position of the valves $l'$ and 10$^a$ is unaffected. The end 14$^b$ of the floating link 14 moves over the depressed surface 17$^b$ of the cam 17; causing greater movement of the lever 13 and butterfly valve $l$, and therefore greater changes in fuel and air delivery to the group of four cylinders E, B, C and H, than would be the case if the end of the floating link 14 engaged surface 17$^c$ of the cam 17, as it would during eight-cylinder firing when both carburetor jets would be functioning.

If, however, the driver wishes to accelerate rapidly, and he depresses the accelerator pedal to an extent equalling perhaps one-fourth of its total movement, several things happen in quick succession. Movement of the connecting rod 16ª, crank arm 12, floating link 14, and levers 13 and 40 effect the opening of butterfly valve l, quite a lot this time, and enough fuel and air is admitted to the intake manifold M to increase the power produced in the four firing cylinders; such action markedly reducing the vacuum in the manifold channel M and changing it approximately (perhaps) from twenty inches to five inches of mercury.

The effect of this reduced vacuum is transmitted through tube 18 to bellows diaphragm 20 of the governing mechanism O, shown in Fig. 4, and the bellows diaphragm is no longer able to maintain its compressed condition against the force of spring 20ª so that its head moves outwardly, moving levers 22 and 23 in the same direction and opening the valve 19ª. Air then flows past valve 19ª through fitting R to the intake manifold M; raising the pressure in tube 19 and cylinder Q to practically that of the atmosphere. Piston 31 then moves downwardly under the action of the torsion spring 35 and through piston rod 31ª, crank arm 32, and rock shaft 33, raises valve 10ª from its seat 10 so that fuel flow to main jet l⁵, and to the idling jet l¹¹, if the latter is employed, is resumed. Explosions again take place in the group of cylinders A, F, G and D, which then add their power to that of the group of cylinders E, B, C and H already firing, and movement of the car is accelerated.

Simultaneously with the opening of valve 10ª, the link 34 moves downwardly; rotating cam 17 from the position shown in Fig. 7, to that shown in Fig. 6, and permitting lever 40 to move clockwise under the action of a spring 45 until the pin 40ª on said lever 40 engages with lever 13. Movement of the latter effects movement of the butterfly valve l' through sleeve shaft 11ª until the open position of said butterfly valve l' exactly equals that of butterfly valve l. From then on, the fuel air delivery to both groups of cylinders is equal.

Clockwise rotation of the cam 17 positions the end of the floating link 14 on the surface 17ᶜ of said cam; moving said end and the slide 15 outward with respect to the lever 13 and slightly turning said lever clockwise to slightly close butterfly valve l' to compensate for the increase in power production resulting from the explosions again taking place in cylinders A, F, G and D. Complete compensation only takes place, however, when the mechanism shifts from the condition of four firing cylinders to eight firing cylinders, or vice versa, as the result of a change in engine speed or load, affecting operation of the governor mechanism P. Partial compensation results when the shift follows a change in accelerator pedal position so that the car speeds up or slows down as the driver would normally expect when using the conventional form of carburetor.

Further movement of the accelerator pedal 16, moves crank arm 12, lever 13, shaft 11, sleeve shaft 11ª, butterfly valve l, floating link 14, slide 15, lever 40, pin 40ª, and butterfly valve l' as a unit, and the fuel-air delivery to each group of four cylinders is changed in an equal amount. Such movement of the pedal carries the end 14ᵇ of the floating link 14 around the cylindrical surface 17ᶜ of cam 17, and said end of the floating link remains at a fixed distance from the center of shaft 11 (and/or 11ª) and the angular relation between lever 13 and lever 40 is likewise fixed. The carburetor then operates exactly like the standard dual jet carburetors with which Ford 1936 V-8 cars are equipped.

Suppose that, while the car is going forty M. P. H., on the level, or on a slight downgrade and while four cylinders are producing power, the driver partially raises the accelerator pedal so that its total depression is ten percent or less of its whole movement. Under such condition the vacuum in the manifold channel M will remain high or increase, and the bellows diaphragm 20 will remain in the position shown in Fig. 4. The car speed will fall off, however, until it drops to twenty or fifteen M. P. H., at which speed the weights 28 of the centrifugal governor P will no longer hold the inner ends of the segmental plates 26 and the rubber block 27 inwardly against the force of spring 29, and these parts will move outward; moving levers 22 and 23 in the same direction and opening the valve 19ª. When this takes place the same events will occur as described above in connection with the case of the driver depressing the accelerator pedal to accelerate rapidly; except that the butterfly valve l will remain in its nearly closed position. Eight cylinders are now firing at low speed despite the high vacuum.

Fig. 11 shows a combined electric and pneumatic governing device that may be employed as an alternative to the centrifugal governor of mechanism illustrated in Figs. 4 and 5, and is of particular merit because it takes advantage of the functions of elements now common to internal combustion engines. It is somewhat limited in its application, however, since it is "snap acting" and may be preferably employed with engines that vibrate least during four-cylinder operation, or to those cases where extreme smoothness of operation is not of great moment. This results from the fact that a governor of the character illustrated in Fig. 11 cuts cylinders into firing service at one fixed speed and one fixed load or vacuum in manifold channel M and cuts them out of firing at a fixed but somewhat lower speed or load, whereas the governor illustrated in Fig. 4 operates at various combinations of engine speed and load through the correlation provided by lever 22. Both the centrifugal governor and bellows diaphragm mechanism of Fig. 4 are graduated in action by contrast with the solenoids and bellows diaphragms of Fig. 11 or Fig. 17, which are designed to operate through their complete stroke with the variation of engine speed and load provided by the holding coil of the generator cut out, and the non-flutter or non-hunting feature provided by the presence of an orifice in the structure shown in Fig. 11, or of a plurality of orifices in the structure illustrated in Fig. 17.

Referring to Fig. 11, the vacuum responsive bellows diaphragm indicated at 71 is equivalent to the bellows diaphragm 20 of the structure illustrated in Fig. 4 and communicates via tube 72, channel 73, orifice 74 and tube 75 with the manifold channel M. The tube 18 and fitting R of Figs. 1 and 12 are dispensed with in this alternative arrangement. The bellows diaphragm 71 responds to changes in vacuum in the intake manifold channel M, and when the pull within it exceeds the compressive force of spring 76, the nut and rod 71ª of the bellows diaphragm move to the right, away from the pivoted contact arm 77 which may subsequently engage the armature 78, of solenoid 79, leaving such contact arm free to move to the right and against the tension in the spring 80 normally holding it out whenever solenoid 79 is energized, with the result that a leak port 81 will be closed by the end 77ᵃ of the contact arm 77 which functions as a valve. The port 81 functions in the same manner as the port of tube 19, controlled by the valve 19ᵃ, of the governing structure shown in Fig. 4.

The solenoid 79 is energized by the ordinary automobile generator and generator cutout of the automobile, diagrammatically indicated in Fig. 11, which shows coils 82 and 83, and a make and break contact 84. This is effected in the following manner. When the engine is running slowly the current delivered from the generator will not magnetize coil 82 of the cutout sufficiently to attract its armature so as to close the contact 84 and deliver current to solenoid 79 or other parts of the electrical system. When, however, the engine speed exceeds that corresponding to a car speed of fifteen to thirty M. P. H., coil 82 receives sufficient energy from the generator to close contact 84. Coil 83 is then energized and adds its magnetism to that of coil 82 so that contact 84 is definitely held closed despite vibration and minor fluctuations in the current or engine speed. Current then flows through the wiring system, through solenoid, 79, the electrical accessories of the engine or car, the storage battery, ground connections and back to the generator from which it started.

Energization of the solenoid 79 draws in spring arm 77 (provided the engine load, etc., is such as to produce sufficient vacuum in manifold channel M to draw in the head of bellows diaphragm 71) and cause its end 77ᵃ to close leak port 81. The sequence of operations is then exactly the same as hereinabove described with respect to the mechanism illustrated in Figs. 6, 7, 8 and 9; and the pressures in cylinder Q are varied (via tube 19) to operate the dual jet carburetor as decribed. Orifice 74 of the structure shown in Fig. 11 is equivalent to orifice 19ᶜ of the structure shown in Fig. 12.

An additional feature of the arrangement illustrated in Fig. 11, and one that applies with equal force to the centrifugal governor of the structure illustrated in Figs. 4 and 5, is provided by the presence of an orifice 85 which establishes pressures in tube 19 in communication with the cylinder Q, that are higher than those that would otherwise occur whenever leak port 81 is open, and this will now be described. Operation of the governing mechanism moves piston 31 (Fig. 2) to cut four cylinders into or out of power-delivering service and slightly readjusts the position of the butterfly valve l, thereby changing the vacuum in channel M of the intake manifold by changing the rate of air flow into it. If the vacuum in the manifold channel M has previously been the amount for which spring 20ᵃ (Fig. 4) or spring 76 (Fig. 11) has been set, this change in vacuum due to operation of the governor will in turn effect operation of the governor through tube 75, and "flutter" of the piston 31 and the carburetor mechanism would result. The presence of orifice 74 avoids this flutter by introducing between the diaphragm bellows 71 and the manifold channel M, a change in vacuum greater in amount and opposite in effect to that produced in manifold channel M by operation of the mechanism of this arrangement. By reason of the change in pressure drop through orifice 85, resulting from the fact that air flows through it when orifice 81 is open (during eight-cylinder firing) and no air flows through it when orifice 81 is closed (during four-cylinder firing), bellows diaphragm 71 is caused to expand until the vacuum in manifold M may be twelve inches of mercury (when orifice 81 opens) and yet remain contracted against the compression in spring 76 (when orifice 81 is closed), while the vacuum in manifold channel M falls off to perhaps eight inches of mercury. The "differential" thus produced is greater than the variation in vacuum in manifold channel M due to operation of piston 31, so that movement of said piston results only from changes in engine speed, or load, and "flutter" is avoided.

A further modification comprising an alternative to the special carburetor features of this invention shown in Figs. 2, 3, 6, et seq., that is of particular merit in the operation of internal combustion engines of twelve or more cylinders, and in marine and stationary engine installations, is shown in Figs. 14, 15 and 16; Fig. 15 being a sectional plan view which may be considered as taken on the line XV—XV, Fig. 4, and Fig. 16 being a sectional elevation on the line XVI—XVI, Fig. 15.

This development of my invention has the additional merit over the dual jet carburetor arrangement described above, in that it provides for splitting a twelve cylinder engine, for instance, into three groups of four cylinders each, or six groups of two cylinders each, and so on, without requiring that the carburetor be divided into a plurality of jets or that the correlated parts be in any way affected by the number of groups of cylinders.

Fig. 15, shows three passages 91, 92, and 93 controlled by valves 91ᵃ, 92ᵃ and 93ᵃ, in place of the single valve 19ᵃ, controlling passage 19, as shown in Fig. 4, and described above. These valves are arranged to be operated in sequence by the centrifugal governor P and the bellows diaphragm 20 through the operation of the floating lever 22 and lever 23; valve 91ᵃ seating at the period of lowest speed and lowest vacuum; valve 92ᵃ at somewhat higher speed and vacuum, and valve 93ᵃ at a still higher level.

The passages 91, 92 and 93 are connected, respectively, through tubes 95, 96 and 97, with a plurality of bellows diaphragms, two of which are shown at 101 and 102, of the structure illustrated in Fig. 14, which in turn are operatively connected to sleeve-type valves, two of which are shown at 105 and 106, controlling inlet passages 105ᵃ and 106ᵃ in communication with the channel 110 of a special form of manifold 111 designed, in this instance, to feed a twelve cylinder motor in groups of three cylinders. The passage 97 controlled by valve 93 will communicate with a third bellows diaphragm of the same character as 101 and 102 (not shown) which in turn is operatively connected to a third sleeve valve (not shown) of the same character as valves 105 and 106 and controlling an inlet passage in communication with manifold channel 110. One group of three cylinders does not have this additional control feature but is directly connected with the carburetor feeding all of the cylinders. The bellows diaphragm 20 illustrated in Fig. 4 will be connected to the intake manifold feeding this last group of cylinders.

Successive closure of valves 91ᵃ, 92ᵃ and 93ᵃ by the operation of the centrifugal governor P, and bellows diaphragm 20, will successively increase the vacuum in the several bellows diaphragms such as 101 and 102, (and the one not shown) raising the sleeve valves 105, 106 (and the one not shown) and stopping explosions successively in groups of three cylinders, as the speed of the engine increases, or its load decreases, until only one group of three cylinders continues firing. In a manner directly similar to the first described mechanism, this arrangement also provides for the admission of air alone to the idling or non-firing cylinders when the valve 105 is in the position shown in Fig. 14, as indicated by the arrows. Valve 106 is shown in position to connect the intake manifold channel 110 receiving fuel and air from the carburetor with one group of cylinders producing power.

In many instances no special mechanism for insuring an unchanging flow of power from the engine while goups of cylinders are cut into or out of service is required in this alternative form; partly because the engine is divided into more groups of relatively less power per group, and partly because cutting out one group of cylinders, for instance, will reduce the vacuum in intake manifold channel passage 110, and slightly increase the fuel and air delivery to the cylinders remaining in operation. Many marine and stationary engines will not require further refinement to provide for this correction.

Fig. 17 shows another arrangement of mechanism for carrying out my general method for multi-cylinder engine control, and having the following features which distinguish it from the forms of mechanism already described. A single seating pneumatic control valve 77ª, such as already described and shown in Fig. 11, is replaced by a pair of plural seating valve structures 115 and 116, designed to effect the operation of a rockable, double-acting piston 310, disposed in a casing Q' and operatively connected to shaft 33 of the structure shown in Fig. 2. The seats for these valves are indicated at 115ª and 115ᵇ, and 116ª and 116ᵇ; the upper seats 115ᵇ and 116ᵇ being formed in plug elements 118 and 119 carried by the casing 111ª. The valves 115 and 116 are normally held in the raised position and in engagement with the upper seats 115ᵇ and 116ᵇ, respectively, by means of springs 115ᶜ and 116ᶜ, and the plug elements 118 and 119 have passages 118ª and 119ª opening from said upper seats.

The structure shown in Fig. 17 includes a solenoid 120 (corresponding to the solenoid 79 of the structure of Fig. 11) having two windings indicated at 120ª and 120ᵇ; winding 120ª duplicating that of solenoid 79, of Fig. 11, and the other winding 120ᵇ, with its related connections and actuated devices providing for four-cylinder operation whenever the motor is idling, regardless of its speed, with the result that further savings in gas consumption will be realized.

The operation of the modified arrangement shown in Fig. 17 is as follows:

Energization of winding 120ª of solenoid 120 through the operation of cutout 84 (Fig. 11) by the generator operating at relatively high speed will draw the left hand end of the lever 121 down so that valve 116 will seat at its lower end and valve 115 will seat at its upper end. Vacuum from the intake manifold M will draw through the tube 18, lower open seat of valve 115, and channel 122, and move piston 310 to the right; air entering the left side of casing Q' via channel 123 and the open upper seat of valve 116 which communicates with the atmosphere through passage 119ª. Shaft 33 will be turned to close valve 10ª, Figs. 2 and 3, and shut off gasoline flow to four cylinders, at the same time moving link 34 upward to the position shown in Fig. 3 to complete the changes required for four-cylinder firing.

All the foregoing takes place provided the vacuum in the intake manifold is sufficient to draw down a bellows diaphragm 130 (through tube 18, channel 131, and orifice 132) against the action of spring 133, so as to open switch 134 and compel the current from the generator to flow through solenoid winding 120ª.

If the throttle is opened sufficiently to break the vacuum in bellows diaphragm 130 below some predetermined point, switch 134 will be closed and the current flowing from the generator to the battery will be short circuited around winding 120ª through switch 134, and the parts will remain in the position shown in Fig. 17, for eight-cylinder firing. Similarly, if the generator speed is too low to cause operation of cutout 84, solenoid 120 will be unaffected and under the action of a spring 135 the parts will remain in the position shown in Fig. 17.

Release of armature 121 by solenoid 120 (due to low motor speed or high motor load) after a period of four-cylinder firing will move valve 116 to close the upper seat and open the lower seat, and will move valve 115 to close the lower seat and open its upper seat; transmitting the vacuum of the intake manifold into the left side of the casing Q' and moving piston 310 to the position shown in Fig. 17, which is the position for eight-cylinder firing.

An additional feature, not heretofore described, is provided by the second winding 120ᵇ of the solenoid 120, which is independently connected in a circuit from the ignition switch of the motor to a contact switch 136 carried by the lever 12ª, which corresponds to lever 12 of the mechanism illustrated in Figs. 6, 7, 8 and 9. This switch "makes" contact whenever lever 12ª moves to its extreme right hand position, resulting from the automobile driver releasing pressure from the accelerator pedal to permit the motor to idle. Under such circumstances the solenoid 120 will be energized, regardless of the speed of the generator or the position of the bellows diaphragm 130; lever 121 will move towards the solenoid 120, and piston 310 will be moved to position the mechanism for four-cylinder firing. The instant the driver's foot depresses the accelerator pedal to move lever 12ª through the rod 16ª away from its contact, the circuit through winding 120ᵇ will be broken and the mechanism will operate to cause four-cylinder firing, as before described, only when the motor speed is above some minimum amount and the motor load is below some maximum amount as reflected by the generator with its cutout and by the position of the bellows diaphragm 130.

In this arrangement of mechanism, the orifices 132 and 137 provide the non-flutter feature due to the presence of orifice 85 of the arrangement shown in Fig. 11. When valve 115 is in its lower position, air flows through its upper seat via passage 124, and orifice 137, to bellows diaphragm 130. Its pressure drops further in passing through orifice 132 to tube 18 and manifold channel M, so that during eight-cylinder firing the vacuum in bellows diaphragm 130 is not as great as the vacuum in manifold M which is in communication with passage 131. During four-cylinder firing, however, when valve 115 is raised, no air flow through orifices 132 and 137 takes place except that required to equalize the vacuum in bellows diaphragm 130 with that in manifold channel M. This differential in vacuum is the "non-flutter" feature described earlier.

The mechanism shown in Fig. 17 provides more power for operation of the shaft 33 than the mechanism illustrated in Fig. 11, and it is therefore more reliable. Switch 134 provides for a more positive interconnection of solenoid 120 and bellows diaphragm 130 than the lever mechanism of Fig. 11. Additionally, the arrangement illustrated in Fig. 17 provides for four-cylinder firing during idling.

Switches 138 and 139 are provided to enable the driver to cut the mechanism of this form of my invention out of service in such manner as to insure eight-cylinder firing. Opening switch 138 and closing switch 139, prevents solenoid 120 from being energized so that lever 121 remains in its upper position as shown in Fig. 17, and piston 310 is moved to, or remains in the position for eight-cylinder firing. Switches 138 and 139 are preferably operated by the choke lever through suitable linkage (not shown) so that eight cylinders fire when a cold motor is started up and so continue in service until the driver perceives that the motor has heated up to its normal operating temperature and sets the choke mechanism at its normal operating position, after which the automatic mechanism of this form of my invention will function. Connection of switches 138 and 139 to the choke mechanism of the automobile relieves the driver from the necessity of giving any throught whatever to the operation of the multi-cylinder control mechanism.

It should be understood that I may connect the levers and links that operate the accelerator pump (not shown) normally a part of such carburetors as are used in the 1936 Ford engine to any part of my mechanism that will cause the injection of an additional supply of gasoline into the four cylinders that are just being put into service so as to hasten their effective operation when eight-cylinder operation is desired.

Comparative tests between the operation of a standard V-8 Ford automobile under usual carburetor feed, and operation of the same automobile in accordance with the method forming the subject of my invention, under identical driving conditions, have shown a material saving in fuel. An indication of this saving is set forth in the chart illustrated in Fig. 20, wherein the horizontal ordinate shows the speed at which the tests were run in miles per hour, and the vertical ordinate indicates the fuel consumption in miles per gallon.

The line A shows fuel consumption of a standard Ford automobile engine under its usual operating conditions, while the line B shows fuel consumption when such engine was operated in accordance with my improved method. Comparative tests indicated at O and X show a saving of forty-five percent (45%) at thirty (30) M. P. H.; comparative tests indicated at O' and X' show a saving of twenty-seven percent (27%) at forty (40) M. P. H., and comparative tests indicated at O² and X² show a saving of nineteen percent (19%) at fifty (50) M. P. H.

All of the above tests were run under identical conditions of driving including the roads traversed, the load of the vehicle, the gasoline used, the lubricants used, the tire pressure, and the amount of acceleration and deceleration. The six tests were made under very nearly identical temperatures and wind conditions.

The mechanism forming the subject of my invention has been more particularly described in connection with the method of controlling the operation of an automobile engine in which the division of cylinders is such that one or more cylinders of each bank fire under all conditions. In the operation of motor boat engines, however, it might be desirable to control the firing of the cylinders in one bank entirely independently of the cylinders of the other bank and a manifold arrangement for independent banks of cylinders is indicated in Fig. 1ᵇ; the channel indicated at M' corresponding to the channel M shown in Figs. 1, 1ª, et seq., while the channel N' corresponds to the channel N shown in said figures.

Various modifications may be made in the foregoing embodiments of my invention without departing from the spirit and scope thereof as set forth in the appended claims.

I claim:

1. The combination, with an internal combustion engine having at least two cylinders, each of which is provided with the usual inlet and exhaust passages and valve means for controlling said passages, of multiple carburetor jets arranged to deliver explosive charges to each of said cylinders independently of the other, and controlling means including a device responsive to increased speed for automatically cutting off feed of fuel to one of said cylinders and similarly increasing the amount of air fed thereto.

2. The combination, with an internal combustion engine having at least two cylinders, of multiple carburetor jets arranged to feed each of said cylinders independently of the other, and controlling means including a device responsive to increased speed and operative to control delivery from one of said jets whereby feed of fuel to one of said cylinders may be cut off.

3. The combination, with an internal combustion engine having at least two cylinders, of multiple carburetor jets arranged to feed said cylinders independently from a common source, means for controlling one of said jets whereby feed of fuel to one of said cylinders may be cut off, and operating mechanism correlated with engine speed for actuating said controlling means.

4. The combination, with an internal combustion engine having at least two cylinders, each of which is provided with the usual inlet and exhaust passages and valve means for controlling said passages, of multiple carburetor jets arranged to independently deliver explosive charges to said cylinders, means controllable by engine speed for automatically regulating the feed of explosive charges to one of said cylinders independently of the other, and means for simultaneously increasing the delivery of fuel to said fuel-receiving cylinder correlated with changes in engine speed.

5. The combination, with an internal combustion engine having at least two cylinders, each of which is provided with the usual inlet and exhaust passages and valve means for controlling said passages, of multiple carburetor jets arranged to independently deliver explosive charges to said cylinders, means controllable by engine load for automatically regulating the feed of explosive charges to one of said cylinders independently of the other, and means for simultaneously increasing the delivery of fuel to said fuel-receiving cylinder correlated with changes in engine load.

6. The combination, with an internal combustion engine having at least two cylinders, each of which is provided with the usual inlet and exhaust passages and valve means for controlling said passages, of multiple carburetor jets arranged to independently deliver explosive charges to said cylinders, means controllable by engine speed and load for automatically regulating the feed of explosive charges to one of said cylinders independently of the other, and means for simultaneously increasing the delivery of fuel to said fuel-receiving cylinder correlated with changes in engine speed and load.

7. The combination, with an internal combustion engine having at least two cylinders, of multiple carburetor jets arranged to independently deliver explosive charges to said cylinders, controlling means including a speed-responsive device operative to independently control delivery from one of said jets whereby feed of explosive charges to one of said cylinders may be cut off, means for simultaneously increasing the delivery of air to said non-fuel-receiving cylinder correlated with changes in engine speed, and means for effecting the firing of all cylinders when starting the engine or operating at subnormal temperatures.

8. The combination, with an internal combustion engine having at least two cylinders, each of which is provided with the usual inlet and exhaust passages and valve means for controlling said passages including a throttle valve and operating means therefor, of multiple carburetor jets arranged to independently deliver explosive charges to said cylinders from a common source, and means coordinated with increased speed for cutting one cylinder out of power-producing operation when the throttle is adjusted for idling conditions.

9. The combination, with an internal combustion engine having at least two cylinders, each of which is provided with the usual inlet and exhaust passages and valve means for controlling said passages, of multiple-jet carbureting means arranged to independently deliver explosive charges to said cylinders, a valve associated with said carbureting means for controlling delivery of explosive charges to one cylinder, means controllable by engine speed for automatically regulating the operation of said valve whereby explosive charges may be delivered to one of said cylinders independently of the other, and means for simultaneously increasing the delivery of air to said non-fuel-receiving cylinder correlated with changes in engine speed.

10. The combination, with an internal combustion engine having at least two cylinders, of multiple-jet carbureting means arranged to independently deliver fuel and air to said cylinders, electrically actuated means operative to independently control delivery from the jets of said carbureting means whereby feed of the explosive charge to one of said cylinders may be cut off, and means correlated with the speed of the engine for effecting actuation of said electrical controlling means and simultaneously increasing the delivery of air to said non-fuel-receiving cylinder.

11. The combination with an internal combustion engine of the V-type having independently operable groups of cylinders, a manifold having separate channels for the separate groups of cylinders, a plurality of carburetor jets for delivering independent explosive charges to said channels, a speed governor operatively connected to to the engine and driven thereby, and fluid-actuated means operatively connected to said speed governor for automatically controlling delivery from one of said jets.

12. The combination with an internal combustion engine of the V-type having independently operable groups of cylinders, a plurality of manifold channels one for each group of cylinders, carbureting means delivering independent explosive charges from a single source to said channels, a governor operatively connected to a moving part of the engine and driven thereby, and fluid-actuated means correlated with the speed of the engine operatively connecting said governor and the carbureting means for automatically cutting off delivery from said carbureting means to one of said manifold channels.

13. The combination, with an internal combustion engine having at least two cylinders, each of which is provided with the usual inlet and exhaust passages and valve means for controlling said passages, of carbureting means arranged to deliver explosive charges to said cylinders independently of each other, a supplemental valve associated with said carbureting means for controlling delivery of fuel to one cylinder, and means including pneumatically actuated elements controlled by engine speed for automatically regulating the operation of said supplemental valve whereby delivery of explosive charges to one of said cylinders may be cut off.

14. The combination, with an internal combustion engine having at least two cylinders, each of which is provided with the usual inlet and exhaust passages and valve means for controlling said passages, of carbureting means arranged to deliver explosive charges to said cylinders independently of each other, a supplemental valve associated with said carbureting means for controlling delivery of explosive charges to one cylinder, and means including electrically actuated elements controled by engine speed for closing said supplemental valve and cutting off delivery of fuel to one of said cylinders.

15. The combination, with an internal combustion engine having at least two cylinders, each of which is provided with the usual inlet and exhaust passages and valve means for controlling said passages, of carbureting means arranged to deliver explosive charges to said cylinders independently of each other, a supplemental valve associated with said carbureting means for controlling delivery of fuel to one cylinder, and means including combined pneumatic and electrically actuated elements controlled by engine suction for closing said supplemental valve and cutting off delivery of fuel to one of said cylinders.

16. In a control for multi-cylinder internal combustion engines, the combination of means for feeding fuel to said cylinders, and means responsive to reduced load for stopping the flow of fuel to at least one cylinder and for increasing the flow of fuel to the cylinders receiving fuel.

17. In a control for multi-cylinder internal combustion engines, the combination of means for feeding fuel to said cylinders in varying amounts, and means responsive to the delivery of smaller fuel charges for interrupting the flow of fuel to one or more cylinders.

18. In a control for multi-cylinder internal combustion engines of the explosion type, the combination of means for feeding fuel to said cylinders, and means responsive to engine suction for interrupting the flow of fuel to one or more cylinders.

19. In a control for multi-cylinder internal combustion engines of the explosion type, the combination of means for feeding fuel to said cylinders, and means responsive to speed and engine suction for interrupting the flow of fuel to one or more cylinders.

20. In a control for multi-cylinder internal combustion engines, the combination of means for feeding fuel to said cylinders, means responsive to speed for interrupting the flow of fuel to one or more cylnders, and automatically operated means for increasing the delivery of fuel to the fuel-receiving cylinders.

21. In a control for multi-cylinder internal combustion engines of the explosion type, the combination of means for feeding fuel to said cylinders, means responsive to engine suction for interrupting the flow of fuel to one or more cylinders, and automatically operated means for increasing the delivery of fuel to the fuel-receiving cylinders.

22. In a control for multi-cylinder internal combustion engines of the explosion type, the combination of means for feeding fuel to said cylinders, means responsive to speed and engine suction for interrupting the flow of fuel to one or more cylinders, and automatically operated means for increasing the delivery of fuel to the fuel-receiving cylinders.

23. In a control for multi-cylinder internal combustion engines of the explosion type, the combination of means for feeding fuel to all of said cylinders simultaneously, means responsive to increased speed for interrupting the flow of fuel to one or more firing cylinders, and automatically operated means for admitting air to the non-firing cylinders.

24. In a control for multi-cylinder internal combustion engines of the explosion type, the combination of means for feeding fuel to all of said cylinders simultaneously, means coordinated with the delivery of smaller fuel charges for interrupting the flow of fuel to one or more firing cylinders, and automatically operated means for admitting air to the non-firing cylinders.

25. In a control for multi-cylinder internal combustion engines of the explosion type, the combination of means for feeding fuel to said cylinders, means responsive to increased engine suction for interrupting the flow of fuel to one or more cylinders, and automatically operated means for admitting air to the non-firing cylinders.

26. In a control for multi-cylinder internal combustion engines of the explosion type, the combination of means for feeding fuel to said cylinders, means responsive to speed for interrupting the flow of fuel to one or more cylinders, and automatically operated means for increasing the delivery of fuel to the firing cylinders and for admitting air to the non-firing cylinders.

27. In a control for multi-cylinder internal combustion engines of the explosion type, the combination of means for feeding fuel to said cylinders, means responsive to speed and engine suction for interrupting the flow of fuel to one or more firing cylinders, and automatically operated means for admitting air to the non-firing cylinders.

28. In a control for multi-cylinder internal combustion engines of the explosion type, the combination of means for feeding fuel to said cylinders, means responsive to engine suction for interrupting the flow of fuel to one or more cylinders; automatically-operated means for admitting air to nonfiring cylinders, and means coordinated therewith for increasing the delivery of fuel to the firing cylinders.

29. In a control for multi-cylinder internal combustion engines of the explosion type, the combination of means for feeding fuel to said cylinders, means responsive to speed and engine suction for interrupting the flow of fuel to one or more cylinders; automatically-operated means for admitting air to non-firing cylinders, and means coordinated therewith for increasing the delivery of fuel to the firing cylinders.

30. In a control for multi-cylinder internal combustion engines, the combination of means for feeding fuel to said cylinders, means responsive to speed for interrupting the flow of fuel to one or more cylinders, and means for affecting the speed-responsive means to effect delivery of more fuel to some of the cylinders at one speed and to all of the cylinders at an appreciably lower speed.

31. In a control for multi-cylinder internal combustion engines of the explosion type, the combination of means for feeding fuel to said cylinders, means responsive to engine suction for interrupting the flow of fuel to one or more cylinders, and means for affecting the engine-suction-responsive means to effect delivery of fuel to some of the cylinders at relatively high engine suction and to all of the cylinders at appreciably lower engine suction.

32. In a control for multi-cylinder internal combustion engines, the combination of means for feeding fuel to said cylinders, means responsive to speed for interrupting the flow of fuel to one or more cylinders, automatically operated means for increasing the delivery of fuel to the firing cylinders, and means for affecting the speed-responsive device to effect delivery of fuel to some of the cylinders at one speed and to all of the cylinders at an appreciably lower speed.

33. In a control for multi-cylinder internal combustion engines of the explosion type, the combination of means for feeding fuel to said cylinders, means responsive to engine suction for interrupting the flow of fuel to one or more cylinders, automatically-operated means for changing fuel delivery to the firing cylinders, and means for affecting the engine-suction-responsive means to deliver fuel to some of the cylinders at relatively high engine suction and to all of the cylinders at appreciably lower engine suction.

34. The combination, with an internal combustion engine having at least two cylinders independently operable, of means arranged to independently deliver fuel and air to said cylinders, electrically actuated means including a generator, control means responsive to variations in the speed of the generator, and means coordinated therewith for controlling the operation of the fuel-feeding means whereby delivery of fuel and air to one of said cylinders may be cut off under certain conditions of engine operation.

35. In a carbureter for multi-cylinder internal combustion engines of the explosion type, means associated therewith for cutting one or more cylinders into and out of firing service, throttle valves in said carbureter, and means for adjusting the throttle valves coordinated with the means for controlling the firing of the cylinders.

36. In a carbureter for multi-cylinder internal combustion engines of the explosion type, automatic means associated therewith for cutting one or more cylinders into and out of firing service, throttle valves in said carbureter, and automatic means for adjusting the throttle valves coordinated with the means for controlling the firing of the cylinders.

37. The combination, with multi-cylinder internal combustion engines of the explosion type, a carbureter, throttle valves in said carbureter, means for cutting one or more cylinders into and out of firing service, and means for adjusting the throttle valves coordinated with the means for controlling the firing of the cylinders.

38. The combination, with multi-cylinder internal combustion engines of the explosion type, of a carbureter, throttle valves in said carbureter, automatic means for cutting one or more cylinders into and out of firing service, and automatic means for adjusting the throttle valves coordinated with the means for controlling the firing of the cylinders.

39. The combination, with an internal combustion engine having at least two cylinders, of multiple jet carburetting means arranged to independently deliver fuel from a common source and air to all of said cylinders simultaneously, a supplemental valve associated with said carburetting means controlling delivery to one of the jets thereof, and controlling means responsive to speed and operable to independently close said valve and render one of said cylinders non-firing.

40. The combination, with an internal combustion engine having at least two cylinders, of multiple jet carburetting means arranged to independently deliver fuel from a common source and air to all of said cylinders simultaneously, a supplemental valve controlling passage of fuel to one of the jets of said carburetting means, controlling means including speed responsive means operable to independently close said valve whereby feed of the explosive charge to one of said cylinders may be cut off to render the same non-firing, and means for simultaneously varying the delivery of fuel to said fuel-receiving cylinder correlated with changes in engine speed.

41. The combination, with an internal combustion engine having at least two cylinders, of multiple jet carburetting means arranged to independently deliver fuel and air to all of said cylinders simultaneously, electrically actuated means operable to control delivery from one of the jets of said carburetting means whereby feed of the explosive charge to one of said cylinders may be cut off to render the same inoperative, and means correlated with the speed of the engine for effecting actuation of said electrical controlling means.

42. In a control for multi-cylinder internal combustion engines, the combination of means for feeding fuel to said cylinders in varying amounts, and means coordinated with the delivery of smaller fuel charges for stopping the flow of fuel to at least one cylinder and for increasing the flow of fuel to the cylinders receiving fuel.

43. In a control for multi-cylinder internal combustion engines, the combination of means for feeding fuel to said cylinders, manually adjustable means for varying said fuel flow, and means coordinated with said last named means for stopping fuel flow to at least one cylinder and for increasing the delivery of fuel to the cylinders receiving fuel.

44. In a control for multi-cylinder internal combustion engines, the combination of means including an accelerator pedal for effecting the feed of fuel to said cylinders in varying amounts, and means coordinated with the movement of said pedal for stopping the flow of fuel to at least one cylinder and for increasing the flow of fuel to the cylinders receiving fuel.

45. In a control for multi-cylinder internal combustion engines, the combination of means including an accelerator pedal for effecting the feed of fuel to said cylinders in varying amounts, means coordinated with the movement of said pedal for stopping the flow of fuel to at least one cylinder and for increasing the flow of fuel to the cylinders receiving fuel, and means responsive to the speed of the engine for affecting said last named means.

KARL W. ROHLIN.